(12) United States Patent
Meredith et al.

(10) Patent No.: US 9,858,575 B2
(45) Date of Patent: Jan. 2, 2018

(54) FRAUD DETECTION VIA MOBILE DEVICE LOCATION TRACKING

(71) Applicants: AT&T Intellectual Property I, L.P., Atlanta, GA (US); AT&T Mobility II LLC, Atlanta, GA (US)

(72) Inventors: Sheldon Kent Meredith, Marietta, GA (US); David Patterson, Los Altos, CA (US); Edmond Abrahamian, Richmond Heights, MO (US)

(73) Assignees: AT&T MOBILITY II LLC, Atlanta, GA (US); AT&T INTELLECTUAL PROPERTY I, L.P., Atlanta, GA (US)

( * ) Notice: Subject to any disclaimer, the term of this patent is extended or adjusted under 35 U.S.C. 154(b) by 3 days.

(21) Appl. No.: 14/572,522

(22) Filed: Dec. 16, 2014

(65) Prior Publication Data

US 2016/0171499 A1    Jun. 16, 2016

(51) Int. Cl.
*G06K 7/00*  (2006.01)
*G06Q 20/40* (2012.01)
*G06Q 20/32* (2012.01)

(52) U.S. Cl.
CPC ..... *G06Q 20/4016* (2013.01); *G06Q 20/3224* (2013.01)

(58) Field of Classification Search
USPC ......... 235/375, 379, 380, 383; 705/5, 35–45
See application file for complete search history.

(56) References Cited

U.S. PATENT DOCUMENTS

| | | | |
|---|---|---|---|
| 6,714,918 B2 | 3/2004 | Hillmer et al. | |
| 8,295,898 B2 | 10/2012 | Ashfield et al. | |
| 8,458,090 B1 | 6/2013 | Batra et al. | |
| 8,626,663 B2 | 1/2014 | Nightengale et al. | |
| 8,682,793 B2 | 3/2014 | Carlson et al. | |
| 8,869,245 B2 | 10/2014 | Ranganathan et al. | |
| 8,885,894 B2 | 11/2014 | Rowen et al. | |
| 2008/0222038 A1* | 9/2008 | Eden | G06Q 20/04 705/44 |
| 2009/0307778 A1 | 12/2009 | Mardikar | |
| 2011/0202453 A1 | 8/2011 | Issa et al. | |
| 2012/0209773 A1* | 8/2012 | Ranganathan | G06Q 20/3224 705/44 |
| 2012/0310836 A1 | 12/2012 | Eden et al. | |
| 2013/0197998 A1* | 8/2013 | Buhrmann | G06Q 30/0255 705/14.53 |
| 2014/0095393 A1 | 4/2014 | Nightengale et al. | |
| 2014/0137199 A1 | 5/2014 | Hefetz | |
| 2014/0310159 A1 | 10/2014 | Zoldi et al. | |

* cited by examiner

*Primary Examiner* — Matthew Mikels (57) ABSTRACT

Methods, computer-readable media and devices for calculating fraud scores for pending payment transactions are disclosed. A method includes a processor receiving a request for a fraud score. The request comprises a notification of a pending payment transaction that is associated with a credit card of a user and associated with a first location. The processor then detects a location of a device associated with the user, calculates a fraud score based upon the location of the device and the first location, and sends a response comprising the fraud score that is calculated.

18 Claims, 4 Drawing Sheets

FRAUD DETECTION VIA MOBILE DEVICE LOCATION TRACKING

The present disclosure relates generally to methods and apparatus for detecting when an unauthorized payment transaction is likely taking place and for providing notifications to responsible entities upon such detection.

BACKGROUND

Credit card fraud is a significant problem for credit card companies, the merchants that accept such credit cards, and legitimate card holders. Often, all that is needed to complete an online purchase is the credit card number, the card expiration date, and a three or four digit authorization code. Cardholder details may also be required. However, given the prevalence of criminals accessing various databases that store such information in one place, such information can easily be obtained for large numbers of credit cards. Thus, a criminal is free to simply select any one of a large number of cards that have been compromised and utilize a set of credentials in order to make fraudulent purchases. In addition, physical cards are often stolen or misplaced, and then used by someone other than the cardholder in a physical retail establishment. In some cases a signature on a receipt or on an electronic pad is required, which may then be compared to the cardholder's signature on the card. In addition, the merchant may ask for additional identification, such as a driver's license, in order to verify that the cardholder is the one making the purchase. However, often these steps are not performed.

SUMMARY

In one example, the present disclosure discloses a method, computer-readable medium and device for determining a fraud score for a pending payment transaction by a processor. For example, the processor may receive a notification of a pending payment transaction associated with a credit card of a user and associated with a first location. The processor may then send a request for a fraud score for the pending payment transaction to a network service provider, where the fraud score is based upon a location of a device associated with the user. The processor then receives the fraud score from the network service provider and authorizes the pending payment transaction to be processed when the fraud score does not exceed a threshold, and sends a notification requiring an additional security measure when the fraud score matches or exceeds the threshold.

In another example, the present disclosure discloses a method, computer-readable medium and device for determining a fraud score for a pending payment transaction by a processor. For example, the processor receives a request for a fraud score. The request may comprise a notification of a pending payment transaction that is associated with a credit card of a user and associated with a first location. The processor may then detect a location of an endpoint device associated with the user, calculate the fraud score based upon the location of the endpoint device and the first location, and send a response comprising the fraud score that is calculated.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses methods, computer-readable media and devices for detecting and preventing fraudulent credit card usage. In particular, embodiments of the present disclosure automatically detect fraudulent credit card usage associated with credit cards that are owned by cardholders who are also mobile device users. In one example, the fraudulent use is detected based upon one or more factors including: a current location at which a point-of-sale purchase transaction is taking place or a current location from which an online order is originating, a current location of a mobile device of the user, a travel speed estimation, and/or historical usage information that identifies the degree of correlation between the current location of credit card usage and the location of the user's mobile device. When the mobile device associated with the user is not at or near the same location as the point of sale terminal or the location from which an online order is originating, the payment transaction is deemed potentially fraudulent. The likelihood that the transaction is fraudulent can be quantified by a fraud score that may be impacted by the additional factors mentioned above.

The location of a point-of-sale terminal can be stored in advance by a credit card company or other entity such that each time a payment transaction with a credit card is commenced, the location can be determined. The location from which an online order originates can be approximated by an Internet Protocol (IP) address, or by device location information determined by the device initiating the purchase transaction and provided to a server processing the payment transaction.

The location of the mobile device of the user can be tracked using various device identifiers across various systems. For instance, a location of the user's mobile device may be tracked by device identifier such as an electronic serial number (ESN), a mobile equipment identifier (MEID), an integrated circuit card identifier (ICCID), an international mobile equipment identity (IMEI) or an international mobile subscriber identity (IMSI), a telephone number, e.g., an E.164 number or a number that is translatable into E.164 format, a media access control (MAC) address of a Wireless Fidelity (Wi-Fi) transceiver, WiMax transceiver, Bluetooth transceiver, and the like, or an IP address. Using such identifiers that are all associated with the same mobile device, the location and presence of the mobile device can be detected by various network components such as an IEEE 802.11 ("Wi-Fi") access point, an IEEE 802.16 ("WiMax") base station, a Bluetooth access point, a Bluetooth low energy (BLE) beacon or other near-field access point, and the like.

As mentioned above, a fraud score may be calculated to indicate a likelihood or a confidence in the prediction that the usage of the credit card is fraudulent. For example, some users may almost always carry their mobile devices with them at all times, whereas other users may often leave their mobile devices at home or in the car. Thus, for users who usually have their phones with them at all times, when a location of a payment transaction does not match a current location of the mobile device, the likelihood that the transaction is fraudulent is greater than for users who are often away from their devices. Thus, while a separation between a location of a payment transaction and a mobile device location is always an indication of potential fraud, the scoring may be different depending upon a historical usage pattern of each individual user.

In one example, the fraud score may also be graded based upon the proximity of the mobile device to the location of the payment transaction, e.g., if the location is in a different state entirely, the fraud score may be higher than if the location indicates the device is still within the same town, or within 1 mile or 5 miles of the requested location, which may result in a higher fraud score that if the device is located within 1000 feet of the requested location (e.g., the device may have been left in a car while the cardholder is shopping in the mall). If the device is still closer to the requested location, an even lower fraud score may result. In one example, the scoring may take into account the degree to which a mobile device can be uniquely associated with an individual. For instance, a parent and a child may share a mobile device, such that the mobile device is often away from the parent during credit card payment transactions. Thus, the owner of the mobile device may be requested to specifically provide the approximate percentage of time that the mobile device is with each person.

Another factor that may be included in the fraud score is whether the mobile device is in-motion. For instance, if the mobile device is in-motion, it is more likely that a current payment transaction is fraudulent. Thus, the fraud score may be increased as compared to when the mobile device is determined to be at rest or "nearly" at rest, e.g., slight movement within a small defined area such as a radius of 10 feet, 15 feet and so on.

Thus, the fraud score may comprise a composite of these various factors. Utilizing the fraud score, a credit card issuer or the payment processor (which may comprise the same entity), may require additional security measures in order to allow a pending payment transaction to be completed. For example, an instruction can be sent to a point of sale terminal to require store personnel to check an identification card of the purchaser or to require a signature comparison to be made before the transaction is completed.

In one example, the present disclosure may be provided as a service to credit card providers and merchants by a network operator. To protect the customer proprietary network information (CPNI), the network operator may not provide actual location data regarding the user's mobile device. For instance, a credit card company may query the network operator with a location of the purchase transaction. The network operator can then respond either with a "true" or "false" indication as to whether the location of the mobile device associated with the credit card matches the location of the purchase transaction. The network operator may also respond with a score that indicates how likely the transaction is fraudulent based upon the location that is submitted. In one example, this may require that the credit card company continuously or periodically provide credit card usage data (i.e., the locations where cards are used) to the network operator. Alternatively, the credit card company can provide historical credit card usage data along with the request (e.g., on a per-request basis). In this way, the network operator can track the degree of collocation between the user device and the credit card and calculate a fraud score accordingly.

Figure 1:
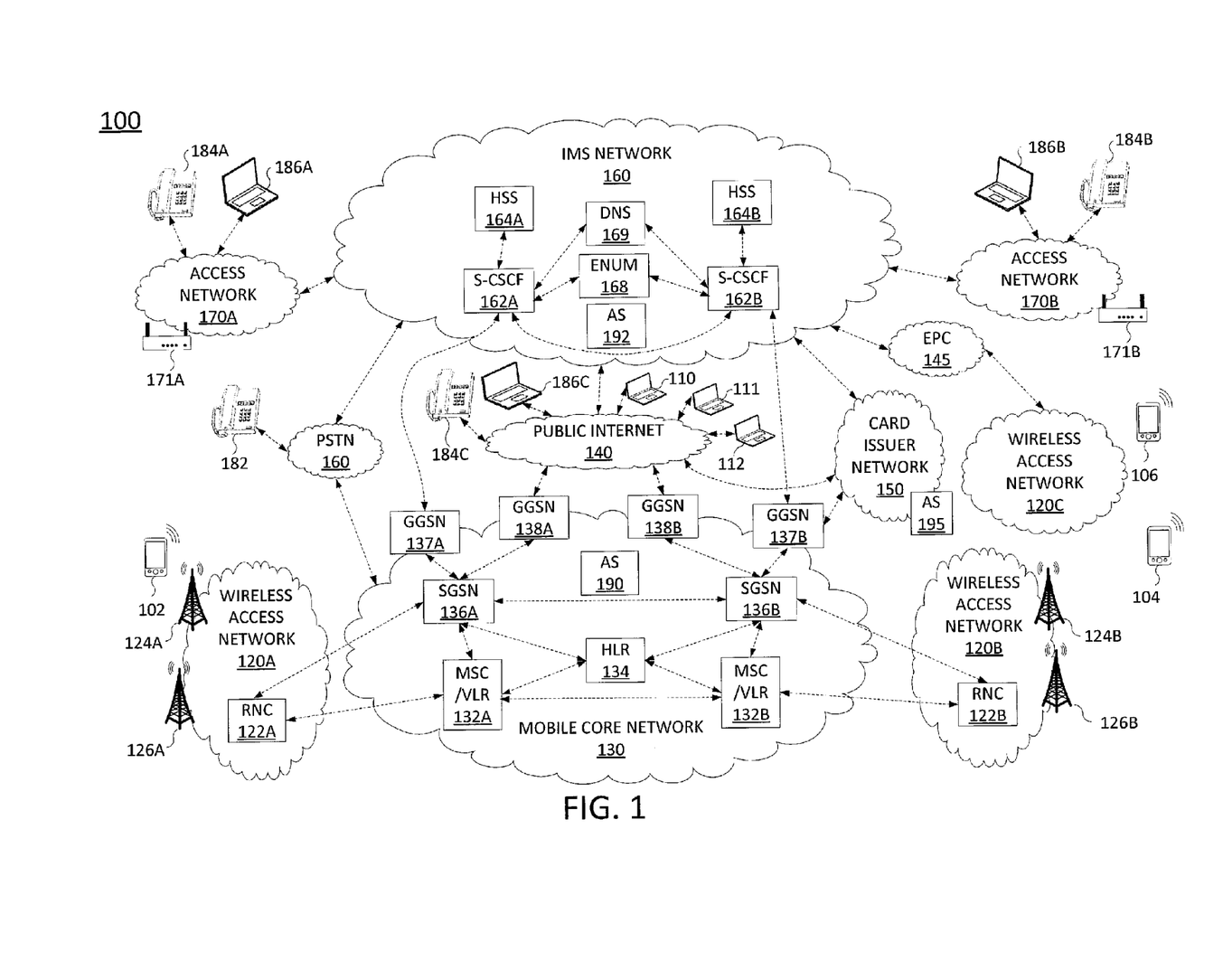
FIG. 1 illustrates an example system related to the present disclosure.

To better understand the present disclosure, FIG. 1 illustrates an example network, or system 100 (e.g., a network having an integrated cellular network architecture), suitable for implementing embodiments of the present disclosure for detecting and preventing fraudulent credit card usage. In particular, system 100 includes example wireless access networks 120A and 120B, and a mobile core network 130 (e.g., a public land mobile network (PLMN)-universal mobile telecommunications system (UMTS)/General Packet Radio Service (GPRS) core network). In one embodiment, each of the wireless access networks 120A and 120B is connected to the mobile core network 130 to provide an integrated cellular network architecture (e.g., a cellular network architecture that includes multi-generational protocols and technologies).

Wireless access networks 120A and 120B may each comprise a radio access network implementing such technologies as: global system for mobile communication (GSM), e.g., a base station subsystem (BSS), GSM enhanced data rates for global evolution (EDGE) radio access network (GERAN), or IS-95, among others, or a UMTS terrestrial radio access network (UTRAN) network, e.g., employing wideband code division multiple access (WCDMA), or a CDMA2000, among others. In other words, wireless access networks 120A and 120B may comprise networks in accordance with any "second generation" (2G) or "third generation" (3G) network technology. Thus, base stations 124A, 126A and 124B, 126B may each comprise a base transceiver station (BTS) or a NodeB. In one example, wireless access networks 120A and 120B may further include radio network controllers (RNCs) 122A and 122B (alternatively referred to as base station controllers (BSCs) in 2G terminology) for managing RF communication of the base stations 124A, 126A and 124B, 126B respectively. RNCs 122A and 122B may perform a variety of wireless network management related tasks such as wireless channel assignments, determining transmission power levels, controlling handovers from one base station to another base station, concentrating multiple signals from mobile endpoint devices for onward transmission to other portions of the respective wireless access networks 120A and 120B, or mobile core network 130, and to perform other functions.

Each of wireless access network 120A and 120B may interface with the mobile core network 130 of system 100 to facilitate communications for various endpoint devices, including mobile devices 102, 104, and 106, each of which may comprise a cellular telephone, a smartphone, a tablet computing device, a laptop computer, a pair of computing glasses, a wireless enabled wristwatch, or any other cellular-capable mobile telephony and computing device (broadly, "mobile endpoint devices").

In one embodiment, mobile core network 130 includes components of a public land mobile network (PLMN). For example, mobile core network 130 may include one or more mobile switching centers (MSCs) 132A and 132B for each wireless access network that forms part of the system 100. The mobile core network 130 may further include one or more home location registers (HLRs), such as HLR 134, which functions as a central repository of authentication and service validation information, subscription information, and other information pertaining to user subscriptions and services. Similarly, respective visiting location registers (VLRs) may be integrated within each MSC 132A and 132B, which function as temporary repositories of authentication and service validation information, subscription information, and other information pertaining to visiting user subscriptions and services when a user's mobile device is located in a particular geographic region serviced by a particular MSC/VLR. For example, MSC 132A may be designated to serve and administer a first coverage area including wireless access network 120A. Thus, MSC 132A may maintain, e.g., in a visiting location register (VLR), user profile records for mobile devices currently serviced by base stations within the portion of the network that is the responsibility of MSC 132A (e.g., mobile device 102). Similarly, MSC 132B may be designated to administer a second coverage area that includes wireless access network 120B and to perform similar functions to those provided by MSC 132A.

Mobile core network 130 may also include GPRS network elements for handling data calls to and from mobile devices. Such network elements may include serving GPRS support nodes (SGSNs) 136A and 136B, gateway GPRS support nodes (GGSNs) 137A, 138A, 137B, and 138B, and related support components including media servers, application servers, and the like. An SGSN refers to a network node responsible for communicating with mobile devices and routing of data calls. Similar to MSCs 132A and 132B, SGSNs 136A and 136B may have specific coverage areas and be assigned to handle specific wireless access networks of the system 100. A GGSN refers to a network node responsible for the interworking between a GPRS network (e.g., components of core network 130 that support GPRS services and functionality) and external packet switched networks, e.g., the public Internet 140, IMS network 160, and other networks.

In general, in a 3$^{rd}$ generation partnership project (3GPP) network, the setup of a data call may be summarized as follows. A mobile device requests connectivity to an external network or service by providing a corresponding Access Point Name (APN) to the GRPS cellular network architecture. During the Packet Data Protocol (PDP) Context activation phase for a mobile device (e.g., a cellular device, such as any of mobile devices 102, 104, and 106), the SGSN serving the mobile cellular device performs a DNS lookup to determine which GGSN(s) are configured for serving the requested APN for the mobile cellular device. The APN for a large external network may be mapped to a number of GGSNs, while a small external network may only be mapped to a single GGSN. GGSN mapping can also be based on load or mobile cellular device location during this process to improve data service quality. The identities of the mapped GGSN or GGSNs are then returned to the SGSN and the SGSN selects one to create a new PDP Context for the mobile device. In the case of IP network access, at the end of the PDP Context activation process, the mobile device also receives its IP address.

The mobile core network 130 may also include, in one embodiment, an application server (AS) 190. In one embodiment, AS 190 may comprise a computing system, such as computing system 400 depicted in FIG. 4, and may be configured to provide one or more functions for detecting and preventing fraudulent credit card usage in accordance with the present disclosure. In one example, AS 190 is configured to receive a request for a fraud score from another application server (AS) 195 associated with a credit card issuer, calculate a fraud score, and provide a response to AS 195, e.g., according to the method 300 depicted in FIG. 3 and described below. Accordingly, the AS 190 may be connected directly or indirectly to any one or more network elements of mobile core network 130, and of the system 100 in general, that are configured to gather and forward network signaling and traffic data and other information and statistics to AS 190 and to receive instructions from AS 190. Due to the relatively large number of connections available between AS 190 and other network elements, none of the actual links to the application server are shown in FIG. 1.

In one example, system 100 may further include an IP multimedia subsystem (IMS) network 160. For instance, IMS network 160 may provide VoIP services to users connecting via access networks 170A and 170B which may comprise a Digital Subscriber Line (DSL) network, a broadband cable access network, a Local Area Network (LAN), a wireless LAN (WLAN), a metropolitan area network (MAN), an enterprise network, or other "trusted access network". In this regard, access networks 170A and 170B may include one or more wireless access points which may each comprise an IEEE 802.11 ("Wi-Fi") access point, an IEEE 802.16 ("WiMax") base station, a Bluetooth access point, a Bluetooth low energy (BLE) beacon or other near-field access point, and the like. The access networks 170A and 170B may be either directly connected to IMS network 160, or indirectly through one or more other networks.

IMS network 160 may also be responsible for routing voice and data calls from cellular networks. For example, calls may enter the IMS network 160 from wireless access network 120C via evolved packet core (EPC) 145, or from wireless access networks 120A and 120B via mobile core network 130. In particular, wireless access network 120C may comprise an evolved UTRAN (eUTRAN) that utilizes IMS network 160 for both voice and data call routing via an all-IP infrastructure.

Notably, mobile core network 130 may be fully equipped to route a voice or data call without invoking IMS network 160. However, in one example, traversal of IMS network 160 may be required to reach a VoIP user via access network 170A or access network 170B, e.g., endpoint devices 184A, 186A, 184B, and 186B respectively, or a 4G cellular user who is on an eUTRAN, e.g., mobile device 106 on wireless access network 120C. For instance, endpoint devices 184A and 184B may comprise Session Initiation Protocol (SIP)-enabled VoIP phones, whereas endpoint devices 186A and 186B may comprise personal computer, laptop computers, and the like, which may be referred to as "softphones." In another example, additional services may be obtained for cellular users on wireless access networks 120A and 120B via the IMS network, e.g., "VoIP over 3G" services, media services, and so forth.

In one example, access networks 120A and 120B and mobile core network 130 may provide 2G/3G fallback coverage in the event that a 4G/LTE access network is not available, or in the event that a mobile device is not 4G/LTE capable. As such, mobile devices may be registered with both IMS network 160 as well as with cellular core network 130. In this regard, it should be noted that EPC 145 and mobile core network 130 are illustrated as separate networks in FIG. 1. However, in another embodiment mobile core network 130 and evolved packet core (EPC) 145 may comprise a single integrated mobile core network for supporting features of 2-4G access networks, as well as any access network that may utilize still to be deployed or developed technologies. As such, in one example wireless access networks 120A, 120B, and 120C, mobile core network 130, EPC 145 and IMS network 160 (as well as access networks 170A and 170B) may all be controlled by a single network operator.

A first portion of IMS network 160 includes a Home Subscriber Server (HSS) 164A and a Serving-Call Session Control Function (S-CSCF) 162A. A second portion of IMS network 160 includes HSS 164B and S-CSCF 162B. A number of shared resources are also present within IMS network 160: an ENUM (tElephone NUmbering Mapping) server 168, a domain name service (DNS) server 169 and an Application Server (AS) 192.

An HSS refers to a network element residing in the control plane of the IMS network that acts as a central repository of all customer specific authorizations, service profiles, preferences, etc., with respect to both "home" users and "visiting" users who are temporarily present within a coverage area assigned to a particular HSS. The HSS may also perform user/endpoint device location tracking. Thus, HSS 164A and HSS 164B may store information relating to VoIP users utilizing access networks 170A, 170B as well as cellular users utilizing access networks 120A, 120B and/or 120C. HSS 164A and HSS 164B may also communicate with one another to confirm authorizations and to obtain user/subscriber records to service visiting users. In addition, as mentioned above, mobile devices may be registered with both IMS network 160 as well as with cellular core network 130. Accordingly, HSS 164A and HSS 164B may be configured to receive updates from HLR 134 regarding endpoint device locations and registrations, and vice versa.

S-CSCFs 162A and 162B reside within the IMS core infrastructure and are connected to various network elements in the IMS network 160 using the Session Initiation Protocol (SIP) over the underlying IMS based core backbone network. S-CSCFs 162A and 162B may be implemented to register users, perform routing and maintain session timers, e.g., for VoIP services. For example, each S-CSCF may also interrogate an HSS to retrieve authorization, service information, user profiles, etc. As illustrated S-CSCF 162A may be configured to utilize HSS 164A, while S-CSCF 162B may be configured to utilize HSS 164B. In addition, S-CSCF 162A and HSS 164A may be delegated a first coverage area while S-CSCF 162B and HSS 164B may be delegated a second coverage area. In one example, these areas may wholly or partially overlap with areas of coverage of mobile core network 130, e.g., the areas assigned to MSC 132A/SGSN 136A and MSC 132B/SGSN 136B, respectively.

In order to complete a call, the S-CSCF may need to interact with ENUM server 168 and DNS server 169 for translating of an E.164 voice network address into an IP address, for example. E.164 refers to an ITU (International Telecommunications Union)-T recommendation which defines the international public telecommunication numbering plan for formatting telephone numbers such that they may be signaled across one or more networks. The E.164 format includes a country code and subsequent digits, but not the international prefix. ENUM refers to a standard protocol defined by the Internet Engineering Task Force (IETF) for translating phone numbers that are in E.164 format to Internet domain names such that a DNS server may resolve the IP addresses for E.164 numbers the same way it resolves traditional website domains. For example, ENUM may be used to transform a phone, a fax or a pager number into a URI (Uniform Resource Identifier).

To illustrate, S-CSCF 163A may translate an original USA phone number of 987-555-1234 to an E.164 formatted number yielding 1-987-555-1234. The E.164 number is then reduced to digits only, e.g., 19875551234. The digits are then reordered back to front, e.g. 43215557891. Once the digits are reordered, dots are placed between each digit and the Internet domain e164.arpa is added to the end. For the above example, the resulting Internet domain is 4.3.2.1.5.5.5.7.8.9.1.e164.arpa.

ENUM server 168 may then be queried by the S-CSCF 162A to resolve on the domain name 4.3.2.1.5.5.5.7.8.9.1.e164.arpa. For each E.164 number that is registered, there may be multiple entries in ENUM server 168 comprising NAPTR (Naming Authority Pointer) resource records, e.g., SIP URIs, which may correspond to a SIP address, a telephone number, a presence service number, an email address, etc.

Each NAPTR resource record contains information pertaining to an order and a preference. In one embodiment, the NAPTR resource records for a particular E.164 number are organized based on the order field and the preference field, e.g., from a lowest order value to a highest order value and from a lowest preference value to a highest preference value. This approach allows a call to be directed to a plurality of possible destinations based upon a preferred order or sequence that can be selectively set by the user.

Furthermore, in one embodiment, each NAPTR resource record may also have an activation field that indicates whether a NAPTR resource record is "active" or "inactive." An "active" field indicates that the NAPTR resource record can be used, whereas an "inactive" field indicates that the NAPTR resource record should not be used. Thus, this approach allows a user to selectively activate or deactivate a NAPTR resource record.

After retrieving one or more NAPTRs from the ENUM server 168, S-CSCF 162A may then query DNS server 169 for the regular routing of the contact information resided in the NAPTR (Naming Authority Pointer) resource records, e.g., the SIP URI. In sum, after querying HSS 164A and performing the steps of authentication, authorization, and so forth, the S-CSCF 162A will send the ENUM query and the ENUM server 168 will return the NAPTR resource records if the E.164 number is registered, where the S-CSCF 162A then queries the DNS server 169 for the destination of the returned records, e.g., an IP address corresponding to the SIP URI. S-CSCF 162A may then route the call to another S-CSCF or to another network as indicated by the IP address.

Figure 3:
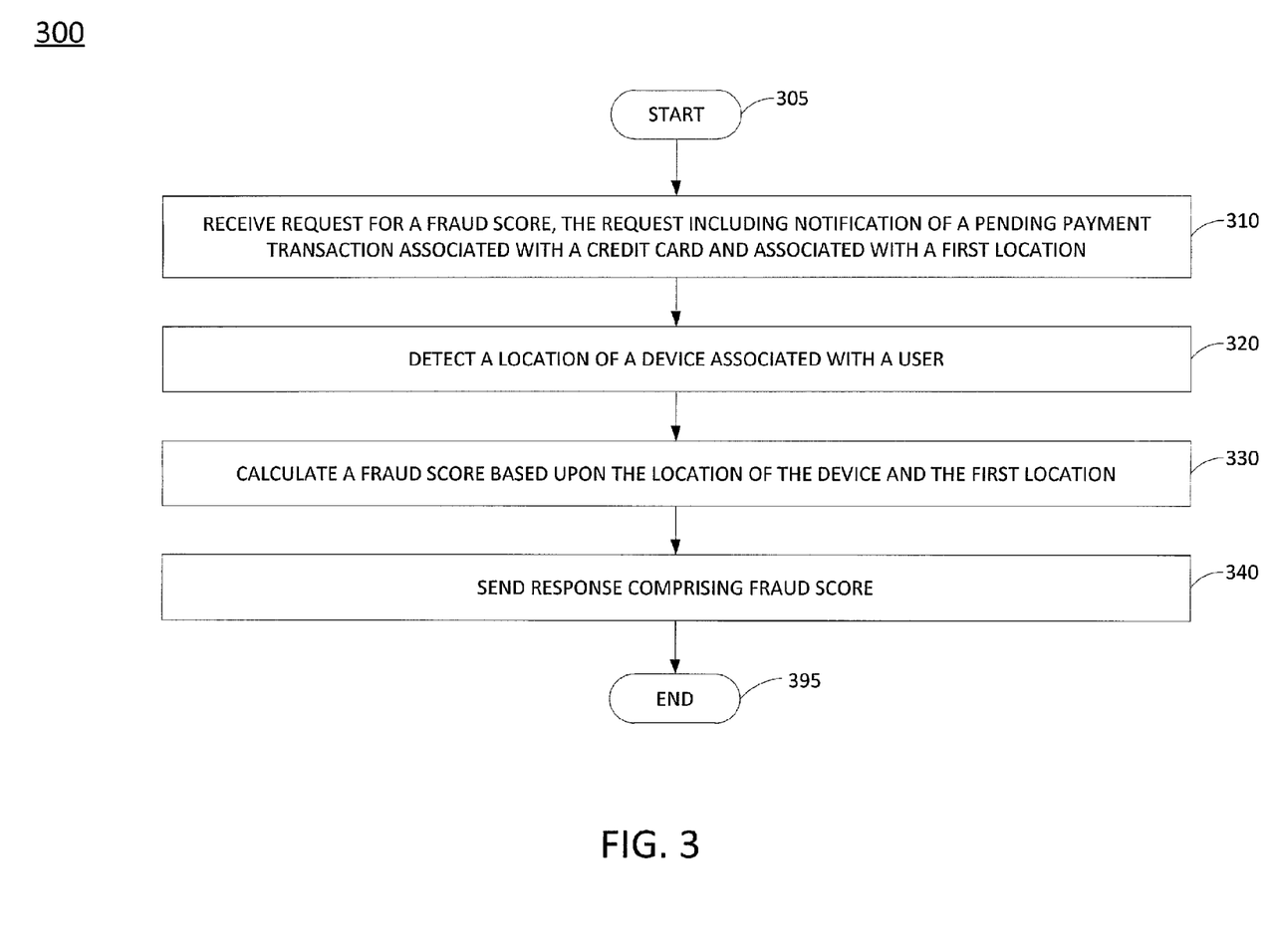
FIG. 3 illustrates a flowchart of an additional method for determining a fraud score, according to the present disclosure.
Figure 4:
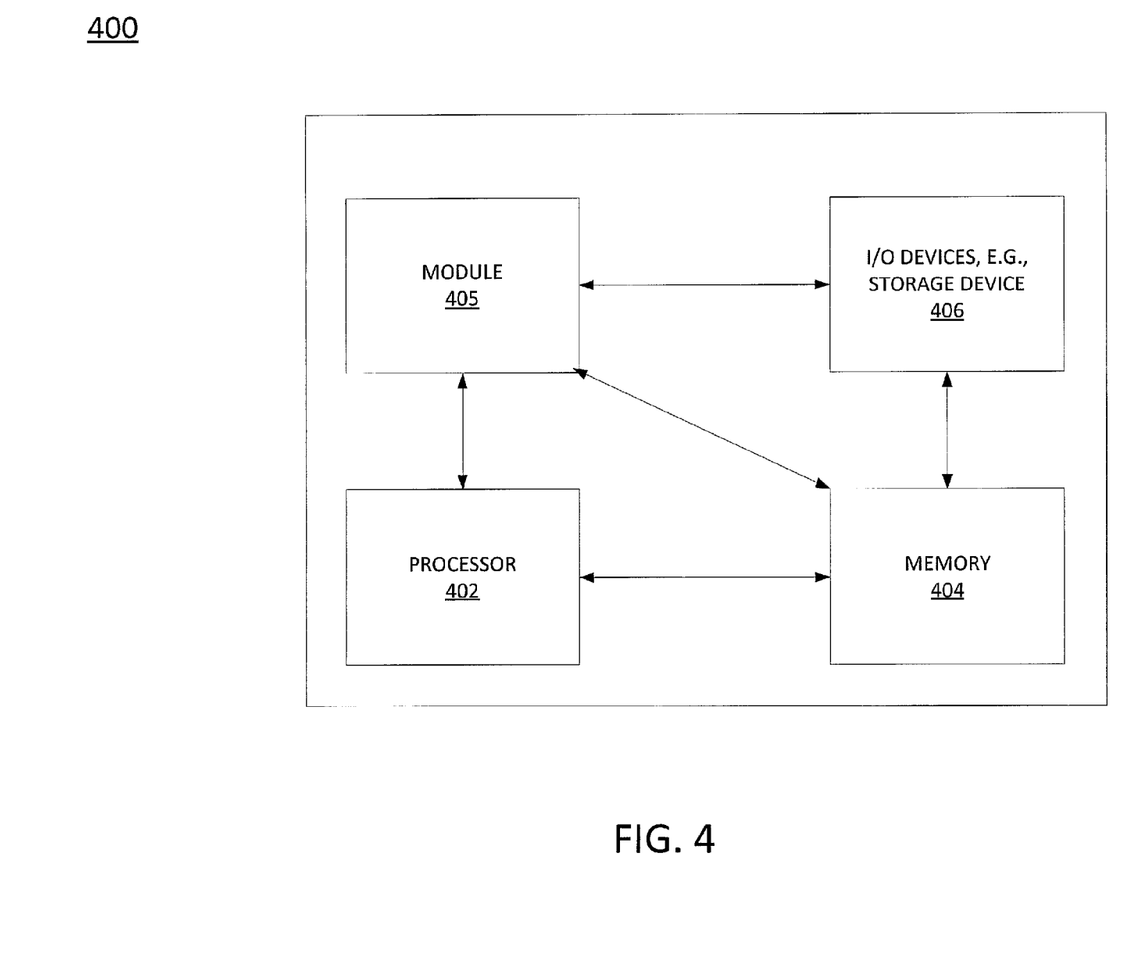
FIG. 4 illustrates a high-level block diagram of a computing device suitable for use in performing the functions, methods, operations and algorithms described herein.

In one embodiment, AS 192 may comprise a computing system, such as computing system 400 depicted in FIG. 4, and may be configured to provide one or more functions for detecting and preventing fraudulent credit card usage in accordance with the present disclosure. In one example, AS 190 is configured to receive a request for a fraud score from AS 195 associated with a credit card issuer, calculate a fraud score, and provide a response to server 195, e.g., according to the method 300 depicted in FIG. 3 and described below. Accordingly, the AS 192 may be connected directly or indirectly to any one or more network elements of IMS network 160, mobile core network 130, and of the system 100 in general, that are configured to gather and forward network traffic data and other information and statistics to AS 192 and to receive instructions from AS 192. Due to the relatively large number of connections available between AS 192 and other network elements, none of the actual links to the application server are shown in FIG. 1. In addition, AS 192 may perform the same or substantially similar functions to those of AS 190. In one example, AS 190 and AS 192 may cooperate to perform various aspects of the present disclosure in a distributed manner.

Each of mobile core network 130 and IMS network 160 may also interface to a public-switched telephone network (PSTN) 160, to enable communications with PSTN end-points, e.g., endpoint device 182, and public Internet 140, to enable communications with devices accessible via the Internet, e.g., endpoint devices 184C, 186C, which may comprise a VoIP phone and a softphone, respectively. For example, VoIP users who are not subscribers of IMS network 160 or who are not on a "trusted access network" may nevertheless send and receive calls involving VoIP endpoint devices of access networks 170A and 170B and/or mobile endpoint devices on wireless access networks 120A, 120B, and 120C via the public Internet 140.

In accordance with the present disclosure endpoint device 102 may be associated with a user who is also a credit card holder. Endpoint device 102 may comprise any type of cellular-capable mobile telephony and computing device (broadly, a "mobile device"). Thus endpoint device 102 is equipped with at least one cellular radio/transceiver and may connect with mobile core network 130 and/or IMS network 160 via any one or more of wireless access networks 120A, 120B and 120C. Endpoint device 102 may also be equipped for any number of different modes of communication. For instance, endpoint device 102 may be further equipped with an IEEE 802.11 transceiver, an IEEE 802.16 transceiver, a Bluetooth transceiver, and so on. In this regard, endpoint device 102 may communicate with mobile core network 130 and/or IMS network 160 via any one or more of these different modes of communication. For instance, endpoint device 102 may travel such that endpoint device 102 connects to IMS network 160 via access network 170A. In one example, access network 170A may comprise an open Wi-Fi network, the user's home Wi-Fi network, or a Wi-Fi network that is provided by the same network service provider that manages IMS network 160, mobile core network 130, etc. Similarly, endpoint device 102 may connect with mobile core network 130 and/or IMS network 160 via the Internet 140.

AS 190 and/or AS 192 may track the location of endpoint device 102 in a variety of ways in conjunction with the system 100. For example, a location of endpoint device 102 may be tracked by device identifier such as an electronic serial number (ESN), a mobile equipment identifier (MEID), an integrated circuit card identifier (ICCID), an international mobile equipment identity (IMEI) or an international mobile subscriber identity (IMSI), a telephone number, e.g., an E.164 number or a number that is translatable into E.164 format, a media access control (MAC) address of a Wi-Fi transceiver, WiMax transceiver, Bluetooth transceiver, and the like, or an Internet Protocol address.

Notably, AS 190 and AS 192 may not actually perform device registrations with the respective networks. Thus, for example, a registration or other message containing device identification information and/or device location information may be received by AS 190 and/or AS 192 as a copy from one or more other network elements that are actively involved in the forwarding and the processing of the registration. Alternatively, or in addition, the location of endpoint device 102 and other endpoint devices may be tracked by one or more home subscriber servers (HSSs), home location registers (HLRs) a network equipment locator service (NELOS) and the like (broadly "cellular location systems"), where the location(s) stored by the respective devices are accessed by AS 190 and/or AS 192 in response to a query from AS 195 in card issuer network 150.

To illustrate, one or more of the device identifiers may be contained in a registration message, a session management message, a response to a paging message, a location update message, or similar message from the endpoint device 102, and may be received via one or more network elements such as gateways/border elements, a P-CSCF, an S-CSCF, an MSC, etc. Depending upon the particular access network and/or the particular connection method utilized by endpoint device 102, different device identifiers may be received for endpoint device 102 at different times. For instance, if endpoint device 102 is in a remote area without cellular coverage or if cellular radio(s) are turned off, but there is currently Wi-Fi access, the device identifier may include the Wi-Fi MAC address and/or an IP address. If endpoint device is in another area with only cellular coverage, the device identifier may not include the Wi-Fi MAC address, but may include the ESN, MEID, IMSI, and so forth.

The location may be contained explicitly within the message, e.g., global positioning system (GPS) location information included in the message from endpoint device 102, serving base station information that is appended to a message by the base station or an MSC, and so forth, or may be determined based upon the route taken by the message and the network device(s) from which the message is received. In one example, endpoint device 102 may connect to system 100 via a proxy device, such as a personal base station, mobile hotspot, a femtocell, and the like. Thus the location of the proxy device may be determined or approximated by AS 190, AS 192 or other component of system 100, and the location of endpoint device 102 is assumed to be at or near the same location that is determined for the proxy device.

For example, base stations, wireless access points, and the like may have known locations which are stored by AS 190 and/or AS 192 such that the approximate location of endpoint device 102 may be inferred based upon the point at which the endpoint device 102 connects to the network. In another example, the approximate location may be determined from the current IP address endpoint device 102. For example, the IP address can be cross-referenced to a database that contains geographic approximations for various blocks of assigned IP addresses. In another example, the location may be determined by comparing relative timing offset information of different mobile endpoint devices that are communicating via the same cellular base station(s) as endpoint device 102. Thus, the location of endpoint device 102 can be determined by AS 190 and/or AS 192 in a variety of ways, and may be stored directly by AS 190 and/or AS 192, or may be stored in an HSS, a HLR, a NELOS system, or other storage location within system 100.

In addition to location information associated with endpoint device 102, and other endpoint devices, the present disclosure may also utilize endpoint device speed information. In one example, the speed information is determined by comparing stored location information of the endpoint device over successive time periods to estimate a speed. In another example, the speed of an endpoint device is determined by a cellular base station and provided as additional data to AS 190 and/or AS 192, or provided to a different network element to be stored in a different storage location within system 100.

Figure 2:
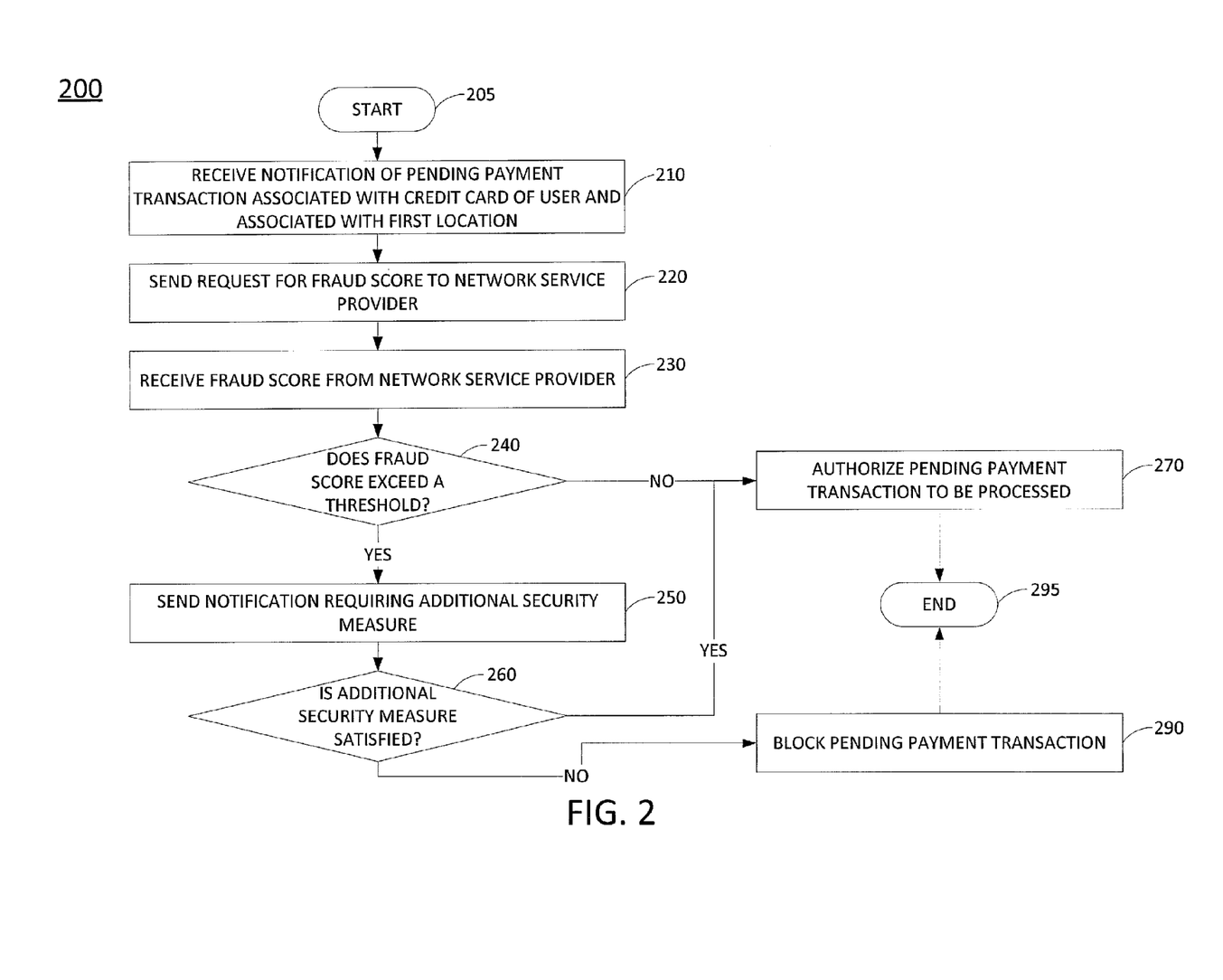
FIG. 2 illustrates a flowchart of a method for determining a fraud score, according to the present disclosure.

The current or last known location of endpoint device 102, and in some cases the current speed of endpoint device 102, can be accessed and/or provided in response to a query to determine the likelihood that a pending payment transaction is fraudulent. In particular, AS 195 in card issuer network 150 may be associated with a credit card issuer. For instance, AS 195 may be involved in processing payment transactions from merchants in connection with credit cards issued by the credit card issuer. Thus, AS 195 may communicate with AS 190 and/or AS 192 as described in greater detail below in connection with the example methods 200 and 300.

AS 195 and/or card issuer network 150 may also be in communication with a number of merchant devices 110, 111, and 112, which may comprise point-of-sale terminals or web servers providing for online purchases. For example, merchant devices 110, 111 and 112 may be operated by partner merchants of the credit card issuer, and are authorized to accept credit card payments. In particular, merchant devices 110, 111 and 112 may communicate with card issuer network 150 to obtain credit card authorizations in any manner that is well known within the industry. Although omitted from FIG. 1 for clarity, merchant devices 110, 111 and 112 may connect to the Internet 140 via any number of access networks, Internet Service Provider (ISP) networks, and so forth in order to communicate with card issuer network 150. In addition, in the case where one of merchant devices 110, 111 or 112 comprises a payment server for completing online purchases, the merchant device may connect with a device of a customer via the Internet 140 and any one or more networks providing access to the merchant device and to the device of the customer. In example, the user of endpoint device 102, and any other number of users may also comprise credit card holders of credit cards issued by the credit card issuer, and may also comprise customers of the respective merchants associated with merchant devices 110, 111 and 112.

In one example, AS 195, or one or more other components of card issuer network 150 stores known locations of merchant devices 110, 111 and 112, the use of which is described in greater detail in connection with the methods 200 and 300 below. In addition, in one example, AS 195, or one or more other components of card issuer network 150 store historical card usage location information in connection with credit cards issued by the credit card issuer. For example, if the user of endpoint device 102 uses his credit card on December 23 at 5:00 PM to make a purchase via merchant device 110 (e.g., a point-of-sale terminal in the merchant's store), the card issuer network 150 may create an entry in a database that stores the date and time of the purchase, the location of the merchant device via which the purchase was completed and the identification of the credit card. Similarly, if the user of endpoint device 102 uses his credit card on December 23 at 7:00 PM to make a purchase via merchant device 111 (e.g., another point-of-sale terminal in a different merchant's store), the card issuer network 150 may create yet another entry in the database, and so forth for any number of purchases completed using the credit card over a period of days, weeks, months, etc.

Notably, in one example, this historical card usage information can be provided by AS 195 to AS 190 and/or AS 192 in order to determine a historical pattern that tracks whether and to what degree the endpoint device 102 and the credit card of the user of endpoint device 102 are co-located at a time of purchase. For example, the locations of endpoint device 102 are tracked by one or more components of the system 100, as described above. Thus, AS 190 and/or AS 192 may determine where endpoint device 102 was located at a time of a previous purchase, and may determine whether this location matches the location of the point-of-sale terminal. This comparison may be made for all or a portion of the historical card usage information to determine an average degree of correlation over a selected time period or over a selected number of previous transactions.

It should also be noted that more and more retail activity is taking place online. As such, a large percentage of credit card usage involves a customer at a location that is remote from the merchant. Thus, AS 195 and/or card issuer network 150 may also track the location, or approximate locations from which online payment transactions are initiated. For example, if a customer on a work or home computer connects to merchant device 112 (e.g., a web server for providing online purchases), the IP address of the customer's device may be viewed by merchant device 112 and provided to card issuer network 150 as part of the card authorization process. Thus, card issuer network 150 may store historical information on the locations, or approximate locations, from which online transactions are initiated in connection with credit cards issued by the card issuer. In addition, certain transactions may be initiated by telephone. Thus, a merchant may receive an order over the phone and enter the credit card information via a point-of-sale terminal or other device of the merchant. Accordingly, the merchant may provide a telephone number from which the order was initiated to card issuer network 150.

In one embodiment, AS 195 may query AS 190 and/or AS 192 requesting a fraud score indicating the likelihood that a new pending payment transaction is fraudulent. In one example, the request may include an identification of the user associated with the credit card and a location (e.g., a location of a point-of-sale terminal, a location from which the transaction originated, or information to allow AS 190 and/or AS 192 to determine a location from which an online or telephone order originated). In one example, the query may also include a time stamp. However, in another example, it may simply be assumed that the time is contemporaneous with the time at which the request is sent and/or received.

AS 190 and/or AS 192 may then determine a current or last known location of endpoint device 102 and compare this to the location received in the query, or determined from other information contained in the query. If there is a match, it may be determined that the transaction is likely to be non-fraudulent. However, if there is a discrepancy, it may be determined that the transaction is more likely to be fraudulent. In one example, the likelihood of fraud may be indicated by AS 190 and/or AS 192 by either a "yes" or "no", or a "true" or "false" response. However, in another example, a fraud score ranging on a numerical scale, e.g., 0 to 100, or on another defined scale such as highly likely, likely, neutral, unlikely, highly unlikely, and so forth, may be provided.

In one example, the fraud score may be based upon a distance between the location provided in the query and the current or last known location of the endpoint device 102, e.g., the greater the distance, the higher the fraud score. In another example, the fraud score is qualified by a historical usage pattern that identifies the degree of correlation between the location of credit card usage and the location of endpoint device 102. For example, it may be the case that the credit card and endpoint device 102 are often not at the same location when the credit card is used to make purchases. Thus, even though a current transaction may involve a point-of-sale that is at a different location than the current location of endpoint device 102, the fraud score may be impacted such that this is less likely to be considered a fraudulent transaction as compared to a transaction for a different user whose historical usage information indicates that his or her credit card is rarely if ever dislocated from the user's endpoint device.

As mentioned above, the request from AS 195 may provide the telephone number from which a telephone order has originated, or an IP address of a device from which an online order has been received. In turn, AS 190 and/or AS 192 may determine the location of the initiation of the transaction by approximating the location of the calling telephone number, e.g., in the case of a landline telephone. In particular, well known databases correlate landline telephone number to street address. Thus, the fraud score can be determined by comparing this location to a current or last known location of endpoint device 102.

On the other hand, for a cellular telephone, the calling number could be compared to telephone numbers which are known to be associated with the user. If there is a match, it may be determined that the transaction is likely non-fraudulent. However, if the number is not a telephone number associated with the user, it may be determined that the transaction is likely fraudulent. It should be noted that the telephone number from which a transaction originated could be the telephone number assigned to endpoint device 102 (e.g., the MIN or MSIN). However, the telephone number could also be a landline home or work telephone number of the user, in which case, the location of the calling telephone number may be compared to the location of the endpoint device 102. For instance, someone could attempt to use the credit card in an unauthorized manner from the user's home, while the user is away on a trip. The fact that the user is away from home can be determined by tracking the location of endpoint device 102.

The foregoing description of an integrated cellular network architecture of system 100 is provided as an illustrative example only. In other words, the example of system 100 is merely illustrative of one network configuration that is suitable for implementing embodiments of the present disclosure. As such, other logical and/or physical arrangements for the system 100 may be implemented in accordance with the present disclosure. For example, network components, such as MSCs 132A and 132B, may be included in respective wireless access network portions (e.g., wireless access networks 120A and 120B) instead of being deployed within the mobile core network 130, or in other portions of system 100 that are not shown, while providing essentially the same functionality. As another example, DNS server 169 may reside in mobile core network 130 or may comprise a public DNS server hosted by another entity on the public Internet 140. Similarly, system 100 may comprise multiple DNS servers, multiple ENUM servers, and so forth. Thus, these and other modifications are all contemplated within the scope of the present disclosure.

In addition, various elements of wireless access networks 120A, 120B, and 120C, EPC 145, mobile core network 130 and IMS network 160 are omitted for clarity, including gateways or border elements providing connectivity between such networks. Similarly, mobile core network 130 and IMS network 160 may each run atop an Internet Protocol/Multi-Protocol Label Switching IP/MPLS network infrastructure, the details of which are also omitted from FIG. 1.

FIG. 2 illustrates a flowchart of a method 200 for determining a fraud score for a pending payment transaction. In one embodiment, the steps, operations or functions of the method 200 may be performed by any one or more of the components of the system 100 depicted in FIG. 1. For example, in one embodiment, the method 200 is performed by application server 195. In another embodiment, the method 200 is performed by application server 195 together with application servers 190 and/or 192 in a distributed manner and in coordination with one another. Alternatively, or in addition, one or more steps, operations or functions of the method 200 may be implemented by a computing device having a processor, a memory and input/output devices as illustrated below in FIG. 4, specifically programmed to perform the steps, functions and/or operations of the method. Although any one of the elements in IMS network 160 or mobile core network 130 may be configured to perform various steps, operations or functions of the method 200, the method will now be described in terms of an embodiment where steps of the method are performed by a processor, such as processor 402 in FIG. 4.

The method 200 begins in step 205 and proceeds to step 210. In step 210, the processor receives a notification of a pending payment transaction associated with a credit card of a user and associated with a first location. For example, a point-of-sale terminal may provide notification of a payment transaction in order to obtain authorization from the credit card issuer. Thus, the notification may include the credit card information, e.g., credit card number, expiration date, name on card and/or security code. The notification may also identify the particular point-of-sale terminal or the merchant. In one example, the processor may determine the location based upon the identity that is provided, e.g., by a look-up in a database that matches merchants and/or point-of-sale terminal to particular locations by coordinates, street address, or other location identifier. In another example, the point-of-sale terminal may provide its location as part of the notification.

In still another example, the notification may be received by the processor from a server that processes online payment transactions. Thus, the notification may, contain an IP address of the device from which the order originated. In another example, the payment transaction may comprise a telephone order. Thus, the notification may include the telephone number from which the order originated. For instance, an automated telephone order system or personnel from the merchant may insert the telephone number in the notification of the pending payment transaction.

At step 220, the processor sends a request for a fraud score to a network service provider. In one example, the request may include information on the first location along with information to identify the credit card holder. Information on the first location may be provided explicitly in the notification, e.g., for a point-of-sale terminal. Alternatively, information on the first location may comprise an IP address or telephone number from which an online or telephone order has originated. Utilizing such information, the network service provider may determine an approximate location from which the purchase transaction was initiated. For example, the location of an IP address can be roughly determined based upon a look-up of assigned IP address blocks cross-referenced to certain assignees, locations, and other information. Similarly, a telephone number of a landline telephone can be resolved to a particular street address or town. In one example, the request may also include historical credit card usage information associated with the credit card. For instance, the credit card issuer may track the locations of past usage of the credit card and the times and dates of the usage. In one example, the identification of the user may comprise the user's name. In another example, the identification of the user comprises a mobile telephone number of the mobile device of the user, e.g., the MIN or MSIN. For instance, when activating the credit card, the credit card holder/user may provide a mobile telephone number to the credit card issuer.

At step 230, the processor receives a fraud score from the network service provider. For example, the network service provider may access or determine a current location of a mobile device of the user based upon the request sent by the processor at step 220. The network service provider may further utilize information regarding a speed of the mobile device, and historical location information of the mobile device, which is then compared to the information received in the request in order to calculate the fraud score. The fraud score is then sent by the network service provider and received by the processor at step 230. The calculation of a fraud score by the network service provider is described in greater detail below in connection with the method 300 of FIG. 3.

At step 240, the processor determines whether the fraud score exceeds a threshold. For example, the credit card issuer may determine a fraud score level that may require additional security measures. Thus, if the threshold is exceeded, the method 200 proceeds to step 250. Otherwise, the method 200 proceeds to step 270 where the pending payment transaction is authorized to be processed.

At step 250, the processor sends a notification requiring one or more additional security measures. For example, an instruction can be sent to a point-of-sale terminal to require store personnel to check an identification card of the purchaser or to require a signature comparison (e.g., an actual signature at the point of sale as compared to the signature behind the credit card) to be made before the transaction is allowed to be completed. In another example, the processor may send a text message, email or automated telephone call to the user and/or the device of the user notifying of the pending payment transaction and requiring the user to send a return message or to place a call back to the credit card issuer in order to authorize the transaction. In still another example, a notification may be sent to a server for processing online payment transactions requesting that the user answer additional security questions. For instance, the processor may provide one or more stored security questions and the respective answers provided to the credit card issuer by the user. One or more of the questions may then be presented as a challenge to authenticate the customer initiating the online transaction. Such security questions could also be provided to a point-of-sale terminal for additional security measures for in-person and telephone orders.

At step 260, the processor determines whether the one or more additional security measures are satisfied. For instance, a store employee at the point-of-sale terminal may enter an input which is conveyed to the processor indicating that the employee has checked the identification and/or the signature of the customer and that the identification and/or signature match the name and signature on the credit card. In another example, the processor may receive an authorization from the user via the user's mobile device or other device associated with the user in response to a notification send at step 250.

When the one or more additional security measures are not satisfied, the method 200 proceeds to step 290. At step 290, the processor blocks the pending payment transaction. For instance, a notification may be sent to a point-of-sale terminal or payment server for online orders indicating that the credit card is denied and terminating the pending payment transaction. In one example, when the credit card has been denied several times within a short period of time, e.g., within the same day, within several hours, etc., the processor may further send a notification that the credit card has recently been associated with other fraud transactions. In one example, the processor may further provide instructions or a suggestion that the customer be detained for security personnel to investigate further or have the credit card removed from the user. Following step 290, the method 200 proceeds to step 295 where the method ends.

If, however, at step 260, the processor determines that the one or more additional security measures are satisfied, the method 200 proceeds to step 270. At step 270, the processor authorizes the pending payment transaction to be processed. In one example, the notification received at step 210 may include details of the purchase, such as the items purchased and the amount to be charged. Thus, in one example, step 270 may involve noting a debit against the credit card account and a corresponding credit the account of the merchant, and sending confirmation to the merchant at the point-of-sale terminal or server for online payment transactions. Following step 270, the method 200 proceeds to step 295 where the method ends.

FIG. 3 illustrates a flowchart of an additional method 300 for determining a fraud score for a pending payment transaction, according to the present disclosure. In one embodiment, the steps, operations or functions of the method 300 may be performed by any one or more of the components of the system 100 depicted in FIG. 1. For example, in one embodiment, the method 300 is performed by application server 190 or 192. In another embodiment, the method 300 is performed by one of application server 190 or 192 in conjunction with the other, or in conjunction with AS 195 in a distributed and coordinated manner. Alternatively, or in addition, one or more steps, operations or functions of the method 300 may be implemented by a computing device having a processor, a memory and input/output devices as illustrated below in FIG. 4, specifically programmed to perform the steps, functions and/or operations of the method. Although any one of the elements in IMS network 160 or mobile core network 130 may be configured to perform various steps, operations or functions of the method 300, the method will now be described in terms of an embodiment where steps of the method are performed by a processor such as processor 402 in FIG. 4.

The method 300 begins in step 305 and proceeds to step 310. At step 310, the processor receives a request for a fraud score, e.g., from a credit card issuer. The request may include notification of a pending payment transaction associated with a credit card and information regarding a first location. In one example, the notification identifies a user associated with the credit card, e.g., using the user's name, a MSIN or MIN, or other identifier. In one example, the first location comprises a location of a point-of-sale terminal. In another example, the first location comprises a location from which an online or telephone order has originated. Alternatively, or in addition, the information regarding the first location may comprise an IP address from which an online order has originated or a telephone number from which a telephone order has originated.

At step 320, the processor detects a location of a device associated with the user. For instance, using the identifier, e.g., the user's name or the MSIN of the user's mobile device received at step 310, the processor may look-up current location information for a mobile device of the user. In one example, the location is tracked using various device identifiers such as the MSIN, ESN, MEID, ICCID, IMEI, one or more transceiver MAC addresses, an IP address, and the like, across various systems that include various types of telecommunications access technologies including: cellular base stations, Wi-Fi access points, WiMax base stations, Bluetooth access points, Bluetooth low energy (BLE) beacons or other near-field access points, and so forth. In one example, the location information from these various sources is stored in a centralized storage device, e.g., in database of such storage device, that tracks a current location of the mobile device. In one example, the location of the mobile device may also be estimated based upon the known locations of such network components that are involved in messages between the mobile device and network service provider infrastructure.

For example, the location of the mobile device may be contained explicitly within a message from the mobile device, e.g., global positioning system (GPS) location information, serving base station information that is appended to a registration by the base station or an MSC, and so forth, or may be determined based upon the route taken by the message and the network device(s) from which the message is received. For example, base stations, wireless access points, and the like may have known locations such that the approximate location of the mobile device may be inferred based upon the point at which the mobile device connects to the network. In another example, the approximate location may be determined from the current IP address of the mobile device. In another example, the location may be determined by comparing relative timing offset information of different mobile devices that are communicating via the same cellular base station(s).

In one example, the same or a different database stores historical location information of the mobile device. Accordingly, at step 320 the processor may additionally retrieve the historical location information. At step 320, the processor may also retrieve speed information associated with the mobile device of the user. For instance, the same or a different database may store current speed information for the mobile device. In another example, the speed may be calculated based upon the current location at a current time and a previous location at a previous time contained in the historical location information.

At step 330, the processor calculates a fraud score based upon the location of the device of the user and based upon the first location. In one example, a current or last known location of the user's mobile device is compared to the first location received in the request. If there is a match, it may be determined that the transaction is likely to be non-fraudulent. Thus, for example, a fraud score of zero ('0') may be assigned. However, if there is a discrepancy, it may be determined that the transaction is more likely to be fraudulent. In one example, the likelihood of fraud may be indicated by either a "yes" or "no", or a "true" or "false" response. However, in another example, a fraud score ranging on a numerical scale, e.g., 0 to 100, or on another defined scale such as highly likely, likely, neutral, unlikely, highly unlikely, and so forth, may be provided.

In one example, the fraud score may be based upon a distance between the location provided in the query and the current or last known location of the user's mobile device, e.g., the greater the distance, the higher the fraud score. In another example, the fraud score is qualified by a historical usage pattern that identifies the degree of correlation between the location of credit card usage and the location of the mobile device, e.g., determined from the historical credit card usage information that may be received at step 310 and the historical mobile device location information that may be retrieved at step 320. In one example, the fraud score may be further impacted by current speed information of the mobile device. For example, if the mobile device is in motion, the fraud score may be increased as fraud is more likely than if the device is at rest.

Still another factor of the fraud score may comprise whether or not the location provided in the request received at step 310 is a legitimate location based upon a last known location associated with the mobile device. For instance, the mobile device may be carried by the user when travelling along a highway from New York to Philadelphia. The locations and movement may be revealed with high accuracy by GPS coordinates reported to the network by the mobile device, or by simply tracking the base stations to which the mobile device is connecting along the route. At some point, tracking of the location of the mobile device may be lost. This could be due to a lack of signal coverage, a drained battery, and so forth. In another example, the user may simply be located in the same area between New York and Philadelphia, not moving, but where the mobile device is turned off or power lost. An hour later, notification of a payment transaction involving the user's credit card could be received from Houston, San Francisco or a similarly far off location. If it is implausible for the mobile device to have travelled from the Philadelphia area to Houston or San Francisco so quickly, then the fraud score may be increased. For instance, a maximum speed of a commercial airliner may be applied to a geographic distance from the last known location of the mobile device to the location associated with the payment transaction to determine an absolute minimum period of time that it would take for a mobile device to realistically be transported to the location associated with the payment transaction. On the other hand, if notification of the pending payment transaction is received two hours later in the Baltimore area, this may be considered to be less likely a fraudulent usage of the credit card, since a car travelling near Philadelphia may realistically reach the Baltimore area within a few hours. As such, the fraud score may not be increased, or may only be increased by a smaller amount.

Another factor may be based upon a calculated trajectory associated with the mobile device of the user. For instance, a distance and a direction from a last known location to the location associated with the payment transaction may be determined and compared to a previously tracked velocity and direction of travel. In one example, a plurality of potential locations or one or more zones of potential location are calculated based upon the last know location and the direction and velocity of travel. To illustrate, the mobile device may be tracked as travelling southwest approximately 65 miles per hour between New York City and Philadelphia. If the location tracking is lost and a notification of a pending payment transaction in Baltimore is received two hours later (where a motor vehicle could easily reach), this may be considered as less likely to be a fraudulent transaction as compared to a location that is not in the trajectory. For example, if two hours later there is notification of a pending payment transaction in Connecticut (to the northeast), while it is possible for a motor vehicle to make this trip from the last tracked location, it is less likely considering that the previous trajectory was southwest at 65 miles per hour. As such, the fraud score may be increased when the location associated with the payment transaction does not match with the previous trajectory.

Thus, the fraud score may comprise a composite of these and other factors. It should be noted that the present disclosure is not limited to any particular scale for the fraud score. However, at a minimum, the fraud score is calculated in manner than it known in advance to the credit card issuer. In one example, each of the factors may be weighted in calculating the fraud score to indicate a relative importance of the respective factor. For example, a factor for the distance between the current mobile device location and the location associated with the payment transaction may be weighted most heavily to indicate that it is the most important factor, whereas a factor based upon the mobile device the speed or trajectory information may be weighted less heavily to account for the fact that accurate calculations of speed and trajectory are less reliable (since speed and direction can change unexpectedly, from the perspective of a tracking system, and often).

At step 340, the processor sends a response comprising the fraud score. In one example, the fraud score may be utilized by a credit card issuer to authorize or deny a pending payment transaction involving the user's credit card, or may be used to determine when to require additional security measures to be implemented prior to allowing the payment transaction to be completed. Following step 340, the method 300 proceeds to step 395 where the method ends.

In addition, although not specifically specified, one or more steps, functions or operations of the methods 200 and 300 may include a storing, displaying and/or outputting step as required for a particular application. In other words, any data, records, fields, and/or intermediate results discussed in the respective methods can be stored, displayed and/or outputted either on the device executing the method 200 or method 300, or to another device, as required for a particular application.

Furthermore, steps, blocks, functions or operations in FIGS. 2 and 3 that recite a determining operation or involve a decision do not necessarily require that both branches of the determining operation be practiced. In other words, one of the branches of the determining operation can be deemed as an optional step. In addition, one or more steps, blocks, functions or operations of the above described methods 200 and 300 may comprise optional steps, or can be combined, separated, and/or performed in a different order from that described above, without departing from the example embodiments of the present disclosure.

The present disclosure may be extended to several additional embodiments. For instance, the present disclosure may be used to flag or score the potential fraudulent use of a passport or identification card. For instance, travelers entering the United States from abroad will present passports to officers of the Department of Homeland Security (DHS). If a mobile device is associated with a particular user and/or with the user's passport or other identification, DHS may query the network service provider regarding the user, or the mobile device associated with the passport and provide the location (e.g., an airport) from which the request is being made. For example, the request could comprise a name, a location and a time stamp. The network provider may then respond "true" or "false", or provide a score based upon the location of the user's mobile device and whether that location corresponds to location the request was issued from (e.g., an airport, a seaport, etc.).

In still another example, an application that runs on a mobile device of the user may be provided that listens for and receives requests from a credit card issuer to provide current location information. If the mobile device is currently addressable over any one or more network connections, the mobile device may then report its location upon receiving the request from the credit card issuer. The network service provider in this case is just a communication carrier, but is not directly involved in the fraud scoring process. However, network service provider-based location tracking, as described above, is more efficient and does not require any extra effort on the part of the mobile device. The mobile device is already configured to register and/or message the network on a periodic basis, and this information may adequately identify the location of the mobile device for purposes of credit card fraud scoring.

As such, the present disclosure provides at least one advancement in the technical field of detecting and preventing fraudulent credit card usage. This advancement is in addition to the traditional methods of requiring additional identification or a signature from a purchaser at a point of sale when a purchase price exceeds a certain amount, or for blocking transactions that are out of the ordinary for the credit card holder. In particular, the present disclosure enables automatic detection of potential fraudulent usage of a user's credit card by tracking the speed and/or location of a user's mobile device and correlating such information with a known location of a point of sale or a location from which an online payment transaction has originated. The present disclosure may also track a historical pattern that correlates device location data and credit card usage location date, and may utilize the historical pattern to further determine the likelihood that a current payment transaction is fraudulent.

The present disclosure also provides a transformation of data, e.g., payment location data, device location tracking, travel speed calculations and historic usage tracking data are transformed into a fraud score which can then be used to determine whether additional security measures for a purchase transaction are required.

Finally, embodiments of the present disclosure improve the functioning of a computing device, e.g., a server. Namely, a server for authorizing a payment transaction is improved by the use of the fraud score, based upon payment location data, device location tracking, travel speed calculations and historic usage tracking data, to provide a more robust payment transaction processing method.

FIG. 4 depicts a high-level block diagram of a computing device suitable for use in performing the functions described herein. As depicted in FIG. 4, the system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for determining a fraud score for a pending payment transaction, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or 300 as discussed above is implemented in a distributed or parallel manner for a particular illustrative example, i.e., the steps of the method, or the entire method is implemented across multiple or parallel computing devices, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method. In one embodiment, instructions and data for the present module or process 405 for determining a fraud score for a pending payment transaction (e.g., a software program comprising computer-executable instructions) can be loaded into memory 404 and executed by hardware processor element 402 to implement the steps, functions or operations as discussed above in connection with the illustrative methods 200 and 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for determining a fraud score for a pending payment transaction (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving, by a processor, a request for a fraud score, the request comprising a notification of a pending payment transaction that is associated with a credit card of a user and associated with a first location;
   detecting, by the processor, a location of a device associated with the user;
   calculating, by the processor, the fraud score based upon the location of the device associated with the user and the first location, wherein the fraud score is further based upon a comparison of historical location information associated with the device associated with the user and historical usage information associated with the credit card, wherein the comparison generates a percentage of historical payment transactions associated with the credit card where the device associated with the user is co-located with a location of one of the historical payment transactions, wherein the fraud score is indicative of a likelihood that the pending payment transaction comprises a fraudulent use of the credit card, and wherein when the first location and the location of the device associated with the user are not a same location, the fraud score is indicative of a greater likelihood that the pending payment transaction is fraudulent; and
   sending, by the processor, a response comprising the fraud score that is calculated.

2. The method of claim 1, wherein the fraud score is further based upon a distance between the first location and the location of the device associated with the user.

3. The method of claim 1, wherein the fraud score is further based upon a determination of whether the device associated with the user is in motion.

4. The method of claim 1, wherein the notification is received from a device associated with an issuer of the credit card.

5. The method of claim 1, wherein the location of the device associated with the user is determined via one of: location information provided by a serving base station, location information provided by a serving wireless access point, location information provided by a cellular location system, global positioning system location information provided by the device associated with the user, and location information provided by a second device that is acting as a proxy for the device associated with the user.

6. The method of claim 1, wherein the device associated with the user is identified via one of: an electronic serial number of the device, a mobile equipment identifier of the device, an integrated circuit card identifier of the device, an international mobile equipment identity of the device, an international mobile subscriber identity associated with the user and with the device, and a media access control address of a transceiver of the device.

7. The method of claim 1, wherein the first location comprises a location of a point-of-sale terminal.

8. The method of claim 1, wherein the pending payment transaction comprises an online transaction, wherein the first location is determined from an internet protocol address from which the online transaction is originated.

9. The method of claim 1, wherein the response is sent to a server that is processing the pending payment transaction.

10. A non-transitory computer-readable medium storing instructions which, when executed by a processor, cause the processor to perform operations, the operations comprising:
    receiving a request for a fraud score, the request comprising a notification of a pending payment transaction that is associated with a credit card of a user and associated with a first location;
    detecting a location of a device associated with the user;
    calculating the fraud score based upon the location of the device associated with the user and the first location, wherein the fraud score is further based upon a comparison of historical location information associated with the device associated with the user and historical usage information associated with the credit card, wherein the comparison generates a percentage of historical payment transactions associated with the credit card where the device associated with the user is co-located with a location of one of the historical payment transactions, wherein the fraud score is indicative of a likelihood that the pending payment transaction comprises a fraudulent use of the credit card, and wherein when the first location and the location of the device associated with the user are not a same location, the fraud score is indicative of a greater likelihood that the pending payment transaction is fraudulent; and
    sending a response comprising the fraud score that is calculated.

11. The non-transitory computer-readable medium of claim 10, wherein the fraud score is further based upon a distance between the first location and the location of the device associated with the user.

12. The non-transitory computer-readable medium of claim 10, wherein the fraud score is further based upon a determination of whether the device associated with the user is in motion.

13. The non-transitory computer-readable medium of claim 10 wherein the notification is received from a device associated with an issuer of the credit card.

14. The non-transitory computer-readable medium of claim 10, wherein the location of the device associated with the user is determined via one of: location information provided by a serving base station, location information provided by a serving wireless access point, location information provided by a cellular location system, global positioning system location information provided by the device associated with the user, and location information provided by a second device that is acting as a proxy for the device associated with the user.

15. The non-transitory computer-readable medium of claim 10, wherein the device associated with the user is identified via one of: an electronic serial number of the device, a mobile equipment identifier of the device, an integrated circuit card identifier of the device, an international mobile equipment identity of the device, an international mobile subscriber identity associated with the user and with the device, and a media access control address of a transceiver of the device.

16. The non-transitory computer-readable medium of claim 10, wherein the first location comprises a location of a point-of-sale terminal.

17. The non-transitory computer-readable medium of claim 10, wherein the pending payment transaction comprises an online transaction, wherein the first location is determined from an internet protocol address from which the online transaction is originated.

18. The non-transitory computer-readable medium of claim 10, wherein the response is sent to a server that is processing the pending payment transaction.

* * * * *